UNITED STATES PATENT OFFICE.

CARL HERING, OF PHILADELPHIA, PENNSYLVANIA.

ELECTRODE FOR SECONDARY BATTERIES.

SPECIFICATION forming part of Letters Patent No. 429,272, dated June 3, 1890.

Application filed February 11, 1889. Serial No. 299,549. (No model.)

*To all whom it may concern:*

Be it known that I, CARL HERING, a citizen of the United States, residing at Philadelphia, in the county of Philadelphia, State of Pennsylvania, have invented certain new and useful Improvements in Secondary Batteries, of which the following is a specification.

My invention relates to the plates of a secondary battery; and the object of my invention is to make such plates solid, self-sustaining, porous, strong, and efficient.

In the United States patent for secondary batteries, No. 372,468, dated November 1, 1887, and issued to me, I described a method by which solid self-sustaining plates of peroxide of lead can be made for use in secondary batteries.

It consists, essentially, of using as a binding material for the pulverulent oxides a soluble salt of lead.

In the present invention I also use a soluble salt of lead for the purpose of binding together the pulverulent materials. I have found that the salt of lead best adapted to this purpose is the acetate, by the use of which I attain a better adhesion of the particles of oxide than with any other. The chief difficulty in making such plates is to make them porous in order that they will form more evenly throughout, and will not crack, blister, laminate, or remain soft inside while forming. To overcome this difficulty, I mix with the usual oxides of lead a reducible compound—salt or oxide of lead—of such nature that when electrolytically converted into the peroxide it shall occupy a smaller bulk or volume, and thus leave an empty or porous space surrounding or in contact with the peroxide so formed. I increase the surface of the electrode by puncturing the molded plastic material before drying. To render the plates harder and stronger before mounting, they are immersed in sulphuric acid. The length of time for this immersion will depend on the extent of the hardening desired. If the mixture composing such plates before forming contains no conducting material, it will form slowly and with difficulty. I therefore mix some peroxide of lead with the other constituents of the material for the plates.

I prefer to make the peroxide plates as follows: A dry mixture of powdered peroxide, minium, and lead carbonate (or sulphate) is mixed with a solution of acetate of lead to the consistency of a stiff paste. This is then pressed into a mold and punctured in numerous places and subsequently dried in an oven. It is then hardened by immersion in sulphuric acid, after which it is mounted and formed.

I do not limit myself to the use of the carbonate or sulphate of lead in the above manufactured plate, since it is evident that in accordance with the principles of my invention I may substitute therefor any salt which when electrolytically converted into the peroxide occupies a smaller space than previously.

The plates may be further strengthened and hardened by a process I will call "treating." This consists in immersing the plates in a solution of a lead salt or compound—such, for instance, as acetate of lead—then drying them, and afterward forming them again with a positive electric current, as usual. This may be repeated as often as desired, thereby giving the plates any degree of hardness and density. By this process of treatment the soluble salt of lead on drying forms a thin coating of crystals on the surface of the porous spaces, and on their conversion to peroxide decreases the size of the porous spaces without diminishing their number.

To still further strengthen the plates and render their surfaces very hard, I electroplate them after they are formed with peroxide of lead by supporting them in a bath of a soluble lead salt—such as the nitrate—together with any suitable cathode, and passing an electric current through this, making the plates the anode. They will then become coated with a layer of deposited peroxide of lead, which is about as hard as highly-tempered steel.

The cathode of the secondary battery is made as follows: A quantity current is passed through an acid bath made of a soluble salt of lead—such, for instance, as the nitrate. The anode in this bath is a slab of lead and the cathode any suitable material, but preferably strips or wires of lead terminating in points. Arborescent crystals of lead will then be formed at the cathode in large quantities.

These crystals are exceedingly thin and possess the property when fresh of adhering to each other, or interlocking when pressed together, thus forming a very porous, tenacious mass, which is soft, pliable, and fibrous, resembling a textile material. These crystals are gathered and kept under water until a sufficient quantity is obtained for a plate. They are then put in a mold and sufficient pressure is applied to make them adhere to each other. After washing, the plate is ready for use in a battery requiring no further charge. I thus obtain a porous strongly coherent plate of finely-divided lead that serves admirably for the plate of a secondary battery.

I claim as my invention—

1. Material to become active for use in a secondary battery, consisting of lead oxide, a soluble salt of lead, and a reducible compound salt or oxide of lead of such a nature that when electrolytically converted into the peroxide it shall occupy a smaller bulk or volume.

2. Material to become active for use in a secondary battery, consisting of insoluble compounds of lead and acetate of lead, substantially as described.

3. As a new article of manufacture, a secondary-battery plate consisting of a mixture of lead oxide and a soluble salt of lead, with a reducible compound salt or oxide of lead of such a nature that when electrolytically converted into the peroxide it shall occupy a smaller bulk or volume, the whole being adapted to form an electrode ready for use on forming, substantially as described.

4. As a new article of manufacture, a secondary-battery electrode consisting of a mixture of lead oxide and a soluble salt pressed into a mold, perforated, and dried, the whole being adapted to form an electrode ready for use on forming, substantially as described.

5. Material to become active for use in a secondary battery, consisting of a plate of peroxide of lead, or material adapted to become peroxide on the passage of a forming current through it, pressed in a mold, subsequently perforated and dried.

6. As a new article of manufacture, a secondary-battery electrode consisting of a molded porous plate of lead peroxide containing in its pores crystals of a soluble salt of lead.

7. As a new article of manufacture, a secondary-battery electrode consisting of a molded porous plate of lead peroxide covered by a coating of lead peroxide of greater hardness than the main body of the plate.

8. As a new article of manufacture, a secondary-battery plate consisting of a molded porous plate of compressed arborescent lead crystals.

CARL HERING.

Witnesses:
G. MORGAN ELDRIDGE,
SAML. P. HANSON.